March 1, 1932.   O. LUHRS   1,847,968
PROCESS FOR THE PRODUCTION OF ALCOHOL FREE FROM WATER
Filed Jan. 3, 1930
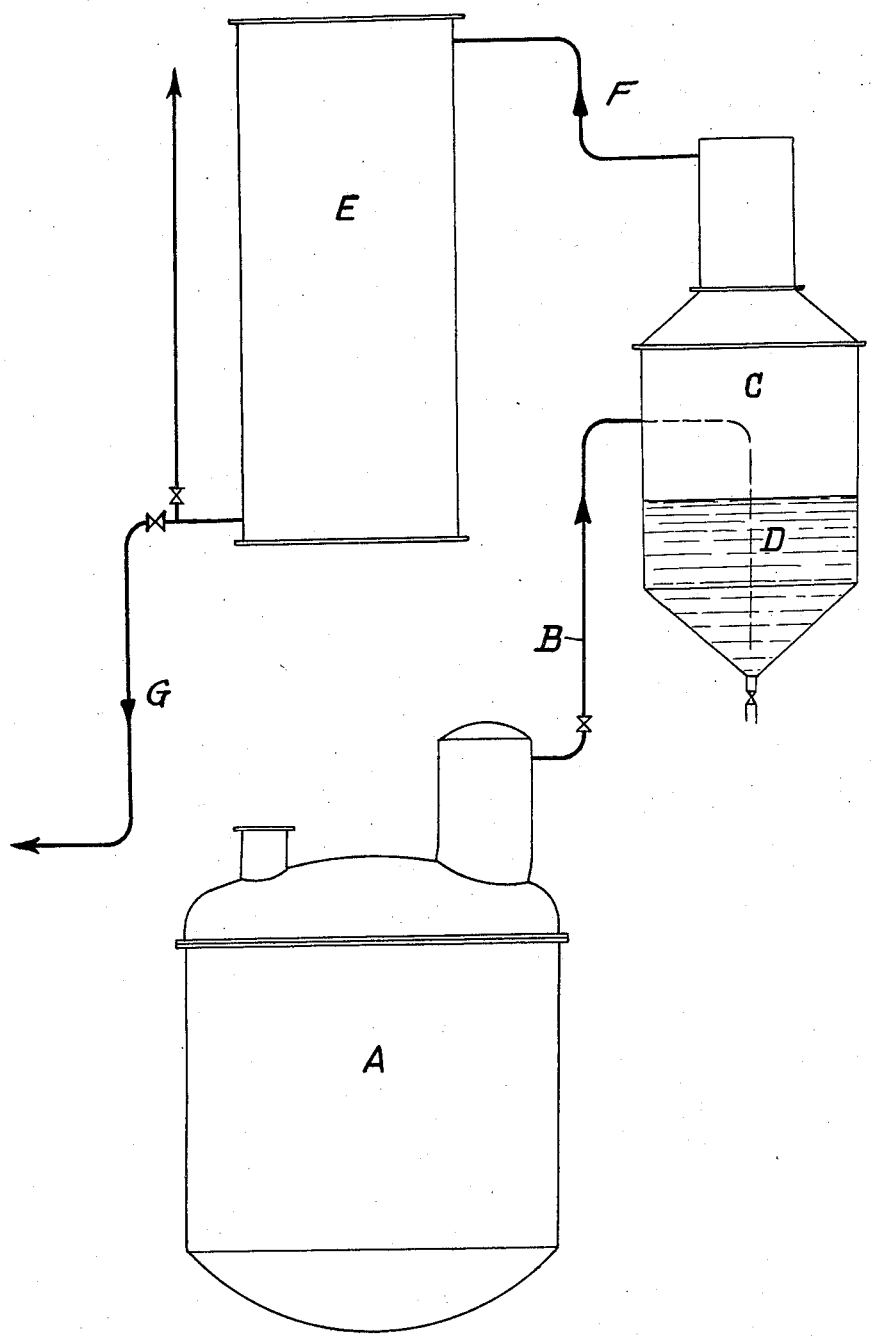
Inventor:
Otto Luhrs Patented Mar. 1, 1932

1,847,968

UNITED STATES PATENT OFFICE

OTTO LUHRS, OF MANNHEIM-WALDHOF, GERMANY, ASSIGNOR OF ONE-HALF TO ZELL-STOFFFABRIK WALDHOF, OF MANNHEIM-WALDHOF, GERMANY, A JOINT-STOCK COMPANY OF GERMANY

PROCESS FOR THE PRODUCTION OF ALCOHOL FREE FROM WATER

Application filed January 3, 1930, Serial No. 418,324, and in Germany January 10, 1929.

Several processes are used for the production of absolute alcohol from diluted (about 94%) spirit by rectification. Thus for example 94% spirit can be rectified by heating it in a closed vessel with calcined chalk under high pressure, and distilling off the absolute alcohol obtained. In this distillation however particles of chalk in the finest colloidal state of distribution are carried over and consequently a cloudy distillate is obtained which must be subjected to a special clarification.

Various methods have been resorted to in order to avoid this cloudiness. The following method has hitherto been proved to be the most suitable: The alcohol vapours containing the chalk are condensed in a container suitable for repeated distillation, small quantities of concentrated sulphuric acid are added to the cloudy distillate obtained and the alcohol is again distilled off. The chalk then separates out as gypsum deposit in the container and the clear distillate is obtained quite free from chalk. Apart from the fact that the absolute alcohol clarified with sulphuric acid is objected to for various reasons, this clarifying process has not been found very satisfactory, as in consequence of the double distillation it is tedious and slow in the carrying out, and necessitates a larger apparatus and considerable quantities of steam and is thus comparatively expensive.

It has now been found that the removal of the finely divided chalk in the alcohol distillate by means of sulphuric acid can be avoided in a very simple manner by allowing the alcohol vapour containing chalk distilling off in the autoclave to pass through a layer of absolute alcohol in a vessel without condensation, and then condensing it afterwards. In this way a perfectly clear distillate is obtained directly, as the very finely divided chalk particles originally carried over, are, as tests have shown, completely retained by the passage of the vapour through the absolute alcohol and are there deposited. By means of the improved process therefore the use of sulphuric acid and a double distillation are entirely avoided, the whole apparatus greatly simplified and furthermore the consumption of heat is reduced.

The process can be carried out for instance by using the apparatus shown on the accompanying drawing as an example, in the following manner:

The autoclave A is filled with the dilute alcohol and a corresponding quantity of calcined chalk. Heat is then applied under a pressure of about 3 atmospheres and the heating continued (if necessary with stirring) for some 1½ hours. When the alcohol is free from water it is distilled off. The alcohol vapours are carried through the pipe B into the chamber C which is filled to about a third of its capacity with absolute alcohol and passed through the body of an alcohol D being thus freed from the chalk particles carried thereby. The alcohol vapours then pass through pipe F into the cooler E, and after being there condensed are drawn off through pipe G and retained in a collecting vessel as clear distillate.

What I claim and desire to secure by Letters Patent of the Unites States is:—

1. A process for the production of a clear, water-free alcohol distillate from dilute alcohol by heating the dilute alcohol with quicklime under a pressure greater than that of the atmosphere, comprising the passing of the vapours of the formed absolute alcohol through a layer of absolute alcohol.

2. A process for the production of a clear, water-free alcohol distillate from dilute alcohol by heating the dilute alcohol with quicklime under a pressure greater than that of the atmosphere, comprising the passing of the vapours of the formed absolute alcohol through a layer of absolute alcohol without appreciable condensation.

3. A process for the production of a clear, water-free alcohol distillate from dilute alcohol by heating the dilute alcohol with quicklime under a pressure greater than that of the atmosphere, consisting in passing the vapours of the formed absolute alcohol through a layer of absolute alcohol without appreciable condensation, finally condensing the vapours and drawing off the absolute pure alcohol.

OTTO LUHRS.